United States Patent Office 3,809,676
Patented May 7, 1974

3,809,676
THERMALLY STABLE FLAME RETARDANT POLY-
CARBONATE COMPOSITION COMPRISING A
POLYCARBONATE AND A STABILIZER
Frank N. Liberti, Mount Vernon, Ind., assignor to
General Electric Company
No Drawing. Continuation-in-part of abandoned application Ser. No. 215,105, Jan. 3, 1972. This application Oct. 30, 1972, Ser. No. 302,206
Int. Cl. C08g 39/10, 51/56
U.S. Cl. 260—45.75 R          10 Claims

ABSTRACT OF THE DISCLOSURE

A thermally stable polycarbonate composition consisting of in admixture an aromatic polycarbonate and 0.05 to about 2.0 weight percent of a particular additive. The particular additive employed herein is one that is a mixture of (a) either a barium, cadmium or cerium salt of aliphatic acid of 2 to 16 carbon atoms or a barium or cadmium carbonate and (b) a phosphinite or a phosphonite.

This application is a continuation-in-part of patent application Ser. No. 215,105 filed Jan. 3, 1972, now abandoned.

This invention is directed to a thermoplastic aromatic polycarbonate composition having excellent resistance to color degradation at elevated temperatures and in particular to a flame retardant aromatic polycarbonate composition having in admixture therewith a certain additive.

BACKGROUND OF THE INVENTION

It is well known in the art to prepare flame retardant polycarbonate compositions by employing halogen substituted bisphenol-A in the preparation thereof. Specifically, U.S. Pat. 3,334,154 discloses such a composition wherein tetrabromobisphenol-A is employed to prepare a polycarbonate composition having excellent flame retardant properties. Flame retardant properties of thermoplastic compositions are extremely high in demand in the industry as a safety feature requirement. In fact, many applications for thermoplastics carry the requirement that the thermoplastic be flame retardant, particularly where they are used by the public or are employed in areas where the public may gather.

As thermoplastics, particularly polycarbonates, find greater use in many new applications, there is a definite trend to higher molding temperatures due to the complicated geometry of the part to be molded and/or the molding of thinner walled sections. Higher molding temperatures are necessary in order for the polycarbonate to completely fill the mold cavity and thereby produce a satisfactory molding shape even though complicated in its design. Unfortunately, when employing flame retardant polycarbonate compositions, as described by the prior art, color degradation of the flame retardant polycarbonate composition occurs due to these higher molding temperatures being employed.

DESCRIPTION OF THE INVENTION

It has now been discovered that by incorporating a particular additive with a flame retardant aromatic polycarbonate composition, the polycarbonate composition has excellent resistance to color degradation at elevated temperatures. Specifically, the amount of the additive employed may range anywhere from 0.05 to about 2.0 weight percent of the additive based on the weight of the total polymer composition. More specifically, the additive employed herein is a mixture of (a) either barium, cadmium or cerium salt of an aliphatic acid, wherein the aliphatic acid contains 2-16 carbon atoms, or the carbonate of barium or cadmium and (b) a phosphonite or a phosphinite. In addition, combinations of any of the above may be employed herein to render the flame retardant polycarbonate composition color stable at elevated temperatures.

It is believed that color degradation as exhibited by streaking of the molded part is due to the thermal instability of the flame retardant composition when exposed to the elevated temperatures during molding. As stated previously, it has now been discovered that this streaking effect or thermal instability can now be relieved or reduced by incorporating the particular additive disclosed above with the flame retardant polycarbonate composition. The flame retardant polymer employed herein is a polycarbonate of a dihydric phenol and a carbonate precursor wherein the polycarbonate may be either, (a) a polycarbonate of a halogen substituted dihydric phenol, (b) a copolycarbonate of an unsubstituted dihydric phenol and a halogen substituted dihydric phenol, (c) a mixture of (a) and (b) or (d) a mixture of a member selected from the group consisting of (a), (b) and (c) with a polycarbonate of an unsubstituted dihydric phenol. The halogens employed may be either bromine, chlorine or mixtures thereof. Preferably, the blend may be 30–99 weight percent and more particularly 70–99 weight percent of a homopolymer of an unsubstituted dihydric phenol such as 2,2-bis(4-hydroxyphenyl) propane (bisphenol-A) and correspondingly 70–1 weight percent and more particularly, 30–1.0 weight percent of a copolymer of (1) 75–25 weight percent of an unsubstituted dihydric phenol such as bisphenol-A and, correspondingly, (2) 25–75 weight percent of a halogen substituted dihydric phenol such as 2,2-(3,3',5,5'-tetrabromo-4,4' - dihydroxy - diphenyl) propane (tetrabromobisphenol-A). Preferably, the copolymer when employed herein may be the same as employed with blend.

The barium, cadmium or cerium salts of aliphatic acids of 2–16 carbon atoms employed herein may be any of the salts such as cadmium 2-ethylhexanoate, cadmium laurate, cadmium stearate, cadmium decanoate, cadmium acetate, barium 2-ethylhexanoate, barium stearate, barium acetate, cerium 2-ethylhexanoate, and cerium acetate. The preferred salt employed herein is cadmium 2-ethylhexanoate.

The carbonates that may be employed in the practice of this invention are barium carbonate or cadmium carbonate and preferably barium carbonate.

The phosphonite that may be employed in the practice of this invention is of the formula

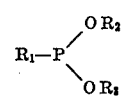

wherein $R_1$, $R_2$ and $R_3$ are independently selected from the group consisting of unsubstituted and halogen substituted alkyl, aryl, cycloalkyl, arylalkyl and alkylaryl radicals of 1–25 carbon atoms. The alkyl may be methyl, ethyl and propyl, isopropyl, butyl, secbutyl, tetriarybutyl, and amyl, isoamyl, tertiary amyl, n-hexyl, dodecyl, nonyl, etc.; the cycloalkyl may be cyclohexyl, 2-methyl-cyclohexyl, 4-methylcyclohexyl, 2-ethyl-cyclohexyl, 4-ethylcyclohexyl, 4-isopropylcyclohexyl, etc.; the aryl may be phenyl, naphthyl, 2-naphthyl, biphenyl or terphenyl, etc.; the aralkyl may be benzyl, phenylethyl, 1-phenylpropyl, etc.; and the alkaryl may be p-tolyl, m-tolyl, 2,6-xylyl, o-tolyl, p-cumyl, m-cumyl, o-cumyl, mesityl, p-tertiary butylphenyl; haloaryl such as 2-chlorophenyl, 2,4,5-trichlorophenyl, 2,4,6-tribromophenyl, etc.; and the substituted portions thereof may be halogen atoms. Typical of some of the phosphonites that can be employed in the practice of this invention are di-(nonylphenyl) phenyl phosphonite, diphenyl phenyl phosphonite, di-(t-butylphenyl) phenyl phosphonite, di-(2,6-xylyl) phenyl phosphonite, and di-isodecyl phenyl phosphonite. The preferred phosphonite to be employed herein is di-(nonylphenyl) phenyl phosphonite.

The phosphinites that can be employed in the practice of this invention are of the formula

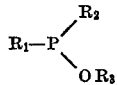

wherein $R_1$, $R_2$ and $R_3$ are independently selected from the group consisting of unsubstituted and halogen substituted alkyl, aryl, cycloalkyl, aralkyl and alkaryl radicals of 1–25 carbon atoms. Typical of such radicals are those set forth previously. Typical of such phosphinites are p-nonylphenyl diphenyl phosphinite, phenyl diphenyl phosphinite, iso-decyl diphenyl phosphinite and ethyl diphenyl phosphinite. The preferred phosphinite to be employed herein is phenyl diphenyl phosphinite.

The additive employed in the practice of this invention is a mixture as set forth previously. The amounts of the component parts of the mixture may vary from about 3 parts of the phosphorous containing component of the mixture per 1 part of the salt or carbonate component to about 1 part of the phosphorous containing component per 3 parts of the salt or carbonate component. Preferably, the mixture employed herein is essentially equal parts of each.

DESCRIPTION OF THE PREFERRED EMBODIMENTS

The following examples are set forth to illustrate more clearly the principles and practice of this invention to those skilled in the art. Unless otherwise specified, where parts or percents are mentioned, they are parts or percents by weight.

EXAMPLE I

A molding composition is prepared by mixing (a) one part of a copolymer prepared by reacting fifty weight percent of 2,2-bis (4-hydroxyphenyl) propane, 50 weight percent of 2,2-(3,3',5,5'-tetrabromo - 4,4' - dihydroxydiphenyl) propane and phosgene in a methylene chloride reaction medium containing therein p-tertiary butylphenol, pyridine and calcium hydroxide, and (b) four parts of a bisphenol-A homopolymer prepared by reacting bisphenol-A with phosgene in a methylene chloride reaction medium containing therein triethylamine, p-tertiarybutylphenol and calcium hydroxide. The polymer blend is then extruded at a temperature of about 525° F. The extrudate is comminuted into pellets. The above composition is then injection molded into specimens of 3" x 2" x 0.125" thick at a molding temperature of 710° F.

Severe color degradation occurs as observed by dark streaks appearing in the molded shape. In addition, the molded specimens break as they are ejected from the mold indicating that the specimens are brittle.

EXAMPLE II

Example I is repeated except that 0.30 weight percent of an additive is added to the polymer composition. The additive consists of a mixture of 4.1 parts of phenyl diphenyl phosphinite and 5.9 parts of cadmium-2-ethylhexanoate. This additive is first mixed and then heated for one hour at 100° C. The additive is then added to the polymer composition which is then extruded under the same conditions as in Example I.

The composition is then molded by injection molding into test specimens 3" x 2" x 0.125" thick at a temperature of 710° F.

The molded specimens do not break upon ejection from the mold and no color degradation is observed.

EXAMPLE III

Example II is repeated except that instead of 0.30 weight percent of the additive employed in Example II, 1.0 weight percent is employed herein.

The results obtained are the same as in Example II.

EXAMPLE IV

Example II is repeated except that the test specimens are molded at a temperature of 740° F.

The molded specimens do not break upon ejection from the mold and no color degradation is observed.

EXAMPLE V

Example II is repeated except that in place of the mixture of phenyl diphenyl phosphinite and cadmium-2-ethylhexanoate, a mixture consisting of 5.8 parts of di(nonylphenyl)phenyl phosphonite and 4.2 parts of cadmium-2-ethylhexanoate is employed herein and which mixture is heated for one hour at 100° C. before adding the mixture to the polymer composition. The composition is then injection molded into test specimens of 3" x 2" x 0.125" thick at a molding temperature of 710° F.

The molded specimens do not break upon ejection from the mold and no color degradation is observed.

EXAMPLE VI

Example V is repeated except that molding of the test specimens is made at a temperature of 740° F.

The molded specimens do not break upon ejection from the mold and no color degradation is observed.

EXAMPLE VII

Example II is repeated except that in place of the additive employed therein, an additive prepared by heating for one hour a mixture of 4.1 parts of diphenyl phenyl phosphonite and 5.9 of barium 2-ethylhexanoate is employed herein.

The composition is then injection molded into test specimen of 3" x 2" x 0.125" thick at a molding temperature of 710° F.

The molded specimens do not break upon ejection from the mold and no color degradation is observed.

EXAMPLE VIII

Example VII is repeated except that the test specimens are molded at a temperature of 740° F.

The molded specimens do not break upon ejection from the mold and no color degradation is observed.

EXAMPLE IX

Example II is repeated except that in place of the mixture of phenyl diphenyl phosphinite and cadmium 2-ethylhexanoate employed therein, a mixture is employed which consists of 5.0 parts of di-isodecyl phenyl phosphonite and 5.0 parts of cerium 2-ethylhexanoate which mixture is first heated for one hour at 100° C.

The composition is injection molded into test specimens of 3" x 2" x 0.125" thick at a molding temperature of 710° F.

The molded specimens do not break upon ejection from the mold and no color degradation is observed.

EXAMPLE X

Example IX is repeated except that a molding temperature of 740° F. is employed herein.

The molded specimens do not break upon ejection from the mold and no color degradation is observed.

As shown in the examples by merely adding the above described additives to a flame retardant polycarbonate composition, a composition is obtained which is color stable at elevated temperatures. This is evidenced by the fact that no streaking occurred at the higher molded temperatures while when employing the flame retardant polycarbonate composition alone, severe streaking occurred at molding temperatures as low as 710° F. and even as low as 680° F. The streaking is a definite indication of thermal instability occurring in the flame retardant composition when such compositions are subjected to elevated temperatures. The mere addition of these minor amounts of additives eliminates this streaking and stabilizes the flame retardant carbonate composition against thermal degradation at elevated temperatures. In addition, as also shown in the examples, brittleness is also greatly reduced when employing the additive mixture of this invention.

In general, in the practice of this invention, the unsubstituted and halogen substituted dihydric phenols employed herein are the dihydric bisphenols or polynuclear aromatic compounds, containing as functional groups, two hydroxyl radicals, each of which is attached directly to a carbon atom of an aromatic nucleus. Typical of some of the dihydric phenols that may be employed herein are dihydric phenols such as bis(4-hydroxyphenyl) methane, 2,2-bis(4-hydroxyphenyl) propane, 2,2-bis(4-hydroxy-3-methylphenyl) propane, 4,4 - bis(4 - hydroxyphenyl)heptane, 2,2-bis (4-hydroxy-3,5-dichlorophenyl) propane, 2,2-bis(4-hydroxy-3,5-dibromophenyl) propane, etc., dihydric phenol ethers such as bis (4-hydroxyphenyl) ether, bis-3,5-dichloro-4-hydroxyphenyl) ether, etc., dihydroxydiphenols such as p,p'-dihydroxyphenyl, 3,3'-dichloro-4,4'-dihydroxydiphenyl, etc., dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy - 2,5-dichlorobenzene, 1,4-di-hydroxy-3-methylbenzene, etc., and dihydroxy diphenyl sulfoxides such as bis-(4-hydroxyphenyl) sulfoxide, bis(3,5-dibromo-4-hydroxyphenyl) sulfoxide, etc. A variety of additional dihydric phenols are also available to provide carbonate polymers and are disclosed in U.S. Pats. 2,999,835, 3,028,365 and 3,153,008.

Generally, the polycarbonate employed herein may be prepared by reacting a dihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

It will be thus seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A thermally stable flame retardant polycarbonate composition consisting of a flame retardant aromatic carbonate polymer and a stabilizing amount of an additive in admixture therewith; said additive being a mixture of (a) from about 1 part to about 3 parts of a material selected from the group consisting of barium, cadmium and cerium salts of aliphatic acids of 2–16 carbon atoms and carbonates of barium and cadmium, and mixtures thereof and (b) from about 3 parts to about 1 part of a phosphorous containing material selected from the group consisting of phosphonites and phosphinites, and mixtures thereof; said flame retardant aromatic carbonate polymer being selected from the group consisting of (a) a polycarbonate of a halogen substituted dihydric phenol, (b) a copolycarbonate of an unsubstituted dihydric phenol and a halogen substituted dihydric phenol, (c) a mixture of (a) and (b), and (d) a mixture of a member selected from the group consisting of (a), (b) and (c) with a polycarbonate of an unsubstituted dihydric phenol; said halogen being selected from the group consisting of bromine and chlorine, and mixtures thereof.

2. The composition of claim 1 wherein the aromatic polycarbonate is a mixture of 30–99 weight percent of a polycarbonate of a dihydric phenol and, correspondingly, 70–1 weight percent of a copolycarbonate of 25–75 weight percent of a dihydric phenol and 75–25 weight percent of a tetrahalogenated dihydric phenol.

3. The composition of claim 1 wherein the additive consists of cadmium-2-ethylhexanoate and a phosphonite.

4. The composition of claim 3 wherein the phosphonite is di-(nonylphenyl) phenyl phosphonite.

5. The composition of claim 1 wherein the mixture consists of barium-2-ethylhexanoate and phosphonite.

6. The composition of claim 5 wherein the phosphonite is di-(nonylphenyl) phenyl phosphonite.

7. The composition of claim 1 wherein the additive consists of cadmium-2-ethylhexanoate and a phosphinite.

8. The composition of claim 7 wherein the phosphinite is phenyl diphenyl phosphinite.

9. The composition of claim 1 wherein the additive consists of barium-2-ethylhexanoate and phenyl diphenyl phosphinite.

10. The composition of claim 1 wherein the additive consists of cerium-2-ethylhexanoate and a phosphonite.

References Cited
UNITED STATES PATENTS

| | | | |
|---|---|---|---|
| 3,647,747 | 3/1972 | Bialous | 260—45.7 |
| 3,404,122 | 10/1968 | Fritz et al. | 260—45.7 |
| 3,320,210 | 5/1967 | Caldwell et al. | 260—45.7 |
| 3,274,156 | 9/1966 | Perry et al. | 260—45.7 |
| 3,622,538 | 11/1971 | Green | 260—45.7 |
| 3,609,118 | 9/1971 | Pilz | 260—45.7 |
| 3,577,381 | 5/1971 | Stewart et al. | 260—45.7 |

DONALD E. CZAJA, Primary Examiner

E. C. RZUCIDLO, Assistant Examiner

U.S. Cl. X.R.

260—18 TN, 45.7 P, 45.7 R, 45.85 R, 47 XA, 860